(12) United States Patent
Suzuki et al.

(10) Patent No.: US 12,291,759 B2
(45) Date of Patent: May 6, 2025

(54) STEEL SHEET AND MANUFACTURING METHOD THEREOF

(71) Applicant: NIPPON STEEL CORPORATION, Tokyo (JP)

(72) Inventors: Yuya Suzuki, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 424 days.

(21) Appl. No.: 17/781,658

(22) PCT Filed: Dec. 17, 2020

(86) PCT No.: PCT/JP2020/047217
§ 371 (c)(1),
(2) Date: Jun. 1, 2022

(87) PCT Pub. No.: WO2021/125283
PCT Pub. Date: Jun. 24, 2021

(65) Prior Publication Data
US 2023/0002846 A1 Jan. 5, 2023

(30) Foreign Application Priority Data
Dec. 19, 2019 (JP) .................. 2019-229401

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS

| | | |
|---|---|---|
| 2014/0150930 A1 | 6/2014 | Lee et al. |
| 2015/0218668 A1 | 8/2015 | Kwak et al. |

(Continued)

FOREIGN PATENT DOCUMENTS

| | | |
|---|---|---|
| CN | 110317991 A | 10/2019 |
| EP | 3 492 610 A1 | 6/2019 |

(Continued)

OTHER PUBLICATIONS

Sekimoto et al., "Effects of Rolling Condition on the Surface Temperature of Work Roll in Hot Strip Mill", Iron and Steel, vol. 61, (1975), No. 10, pp. 2337-2349.

*Primary Examiner* — Anthony M Liang
(74) *Attorney, Agent, or Firm* — Birch, Stewart, Kolasch & Birch, LLP

(57) ABSTRACT

This steel sheet has a specific chemical composition, the tensile strength is 1300 MPa or more, the ratio (R/t) of the limit bend radius to the sheet thickness is less than 3.5, when a depth position of 30 μm from the surface in the sheet thickness direction is defined as a position A and a depth position of ¼ of the sheet thickness from the surface in the sheet thickness direction is defined as a position B, the number density of AlN at the position A is 3000 pieces/mm$^2$ or more and 6000 pieces/mm$^2$ or less, a metallographic structure at the position B includes 90% or more of martensite by volume percentage, and the hardness at the position A is 1.20 times or higher than the hardness at the position B.

12 Claims, 1 Drawing Sheet

(51) Int. Cl.

| | | |
|---|---|---|
| *C21D 6/00* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |
| *C23C 2/28* | (2006.01) | |
| *C23C 2/40* | (2006.01) | |

(52) U.S. Cl.
CPC ............ *C21D 6/008* (2013.01); *C21D 8/0205* (2013.01); *C21D 8/0226* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C23C 2/28* (2013.01); *C23C 2/40* (2013.01)

(56) References Cited

U.S. PATENT DOCUMENTS

| | | |
|---|---|---|
| 2019/0169729 A1 | 6/2019 | Yokoyama et al. |
| 2020/0131597 A1 | 4/2020 | Takashima et al. |

FOREIGN PATENT DOCUMENTS

| | | | | |
|---|---|---|---|---|
| JP | 2004-162163 A | 6/2004 | | |
| JP | 2007262553 A | * 10/2007 | ........... | B32B 15/013 |
| KR | 10-1449119 B1 | 10/2014 | | |
| WO | WO 2013/012103 A1 | 1/2013 | | |
| WO | WO 2018/011978 A1 | 1/2018 | | |
| WO | WO 2018/020660 A1 | 2/2018 | | |
| WO | WO 2019/003541 A1 | 1/2019 | | |

* cited by examiner

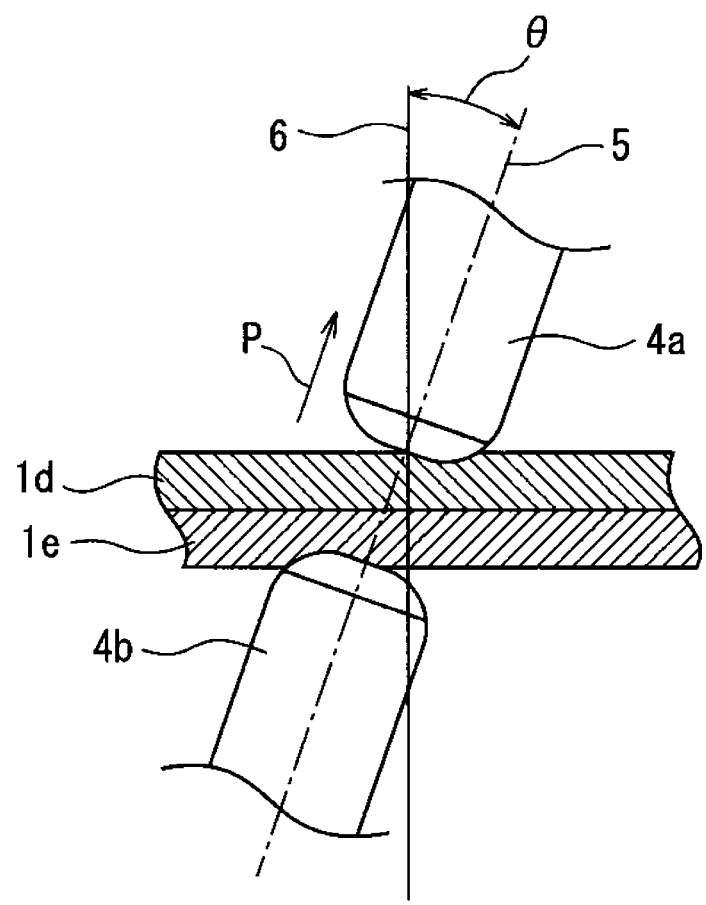

STEEL SHEET AND MANUFACTURING METHOD THEREOF

TECHNICAL FIELD

The present invention relates to a steel sheet and a manufacturing method thereof.

Priority is claimed on Japanese Patent Application No. 2019-229401, filed in Japan on Dec. 19, 2019, the content of which is incorporated herein by reference.

BACKGROUND ART

In recent years, from the viewpoint of regulating greenhouse gas emission as a global warming countermeasure, there has been a demand for improvement in the fuel efficiency of vehicles. Therefore, the application of high strength steel sheets is becoming increasingly widespread in order to reduce the weights of vehicle bodies and ensure collision safety. For example, Patent Document 1 discloses a high strength steel sheet having a tensile strength of 950 MPa or more.

In addition, there is a demand for a hot-dip galvanized ultrahigh strength steel sheet in portions where antirust properties are required. For example, Patent Document 2 discloses a hot-dip galvanized steel sheet having a tensile strength of 1300 MPa or more.

CITATION LIST

Patent Document

[Patent Document 1]
Republished Japanese Translation No. WO 2018/020660 of the PCT International Publication for Patent Applications

[Patent Document 2]
Republished Japanese Translation No. WO 2018/011978 of the PCT International Publication for Patent Applications

Non-Patent Document

[Non-Patent Document 1]
Yasuhiro SEKIMOTO, Morimichi TANAKA, Ryozo SAWADA, Masayoshi KOGA: Tetsu-to-Hagane, Vol. 61 (1975), No. 10, pp. 2337 to 2349

SUMMARY OF THE INVENTION

Problems to be Solved by the Invention

However, when spot welding is performed on a hot-dip galvanized steel sheet having a tensile strength of 1300 MPa or more, there has been a case where liquid metal embrittlement cracking (LME) occurs during the spot welding. As a reason therefor, LME is considered to occur because molten zinc intrudes into prior austenite grain boundaries during the spot welding to embrittle steel and, furthermore, tensile stress is applied to embrittled portions.

Therefore, an objective of the present invention is to provide a steel sheet having a high strength, excellent LME resistance and excellent bendability and a manufacturing method thereof.

Means for Solving the Problem

The present inventors performed intensive studies regarding a method for suppressing the occurrence of the above-described LME. As a result, the present inventors considered that the occurrence of LME can be suppressed by segregating N in prior austenite grain boundaries to suppress the intrusion of molten zinc during spot welding.

The gist of the present invention obtained as described above is as described below.

[1] A steel sheet according to an aspect of the present embodiment,
in which a chemical composition contains, by mass %,
C: 0.15% or more and 0.45% or less,
Si: 0.01% or more and 2.50% or less,
Mn+Cr: 1.20% or more and 4.00% or less,
Al: 0.10% or more and 2.00% or less,
P: 0.040% or less,
S: 0.010% or less,
N: 0.0010% or more and 0.010% or less,
O: 0.006% or less,
Mo: 0% or more and 0.50% or less,
Ti: 0% or more and 0.20% or less,
Nb: 0% or more and 0.20% or less,
B: 0% or more and 0.010% or less,
V: 0% or more and 0.50% or less,
Cu: 0% or more and 1.00% or less,
W: 0% or more and 0.10% or less,
Ta: 0% or more and 0.10% or less,
Ni: 0% or more and 1.00% or less,
Sn: 0% or more and 0.050% or less,
Co: 0% or more and 0.50% or less,
Sb: 0% or more and 0.050% or less,
As: 0% or more and 0.050% or less,
Mg: 0% or more and 0.050% or less,
Ca: 0% or more and 0.040% or less,
Y: 0% or more and 0.050% or less,
Zr: 0% or more and 0.050% or less,
La: 0% or more and 0.050% or less,
Ce: 0% or more and 0.050% or less, and
a remainder including Fe and an impurity,
the tensile strength is 1300 MPa or more,
the ratio (R/t) of a limit bend radius to a sheet thickness is less than 3.5,
when a depth position of 30 μm from a surface in a sheet thickness direction is defined as a position A and a depth position of ¼ of the sheet thickness from the surface in the sheet thickness direction is defined as a position B,
the number density of AlN at the position A is 3000 pieces/mm$^2$ or more and 6000 pieces/mm$^2$ or less,
the metallographic structure at the position B includes 90% or more of martensite by volume percentage, and
the hardness at the position A is 1.20 times or higher than a hardness at the position B.

[2] The steel sheet according to [1],
in which the chemical composition contains, by mass %, one or more selected from the group consisting of
Mo: 0.01% or more and 0.50% or less,
Ti: 0.001% or more and 0.20% or less,
Nb: 0.0001% or more and 0.20% or less,
B: 0.0001% or more and 0.010% or less,
V: 0.001% or more and 0.50% or less,
Cu: 0.001% or more and 1.00% or less,
W: 0.001% or more and 0.10% or less,
Ta: 0.001% or more and 0.10% or less,
Ni: 0.001% or more and 1.00% or less,
Sn: 0.001% or more and 0.050% or less,
Co: 0.001% or more and 0.50% or less,
Sb: 0.001% or more and 0.050% or less,
As: 0.001% or more and 0.050% or less, Mg: 0.0001% or more and 0.050% or less,
Ca: 0.001% or more and 0.040% or less,
Y: 0.001% or more and 0.050% or less,
Zr: 0.001% or more and 0.050% or less,
La: 0.001% or more and 0.050% or less and
Ce: 0.001% or more and 0.050% or less.

[3] The steel sheet according to [1] or [2] may have a hot-dip galvanized layer on the surface.

[4] The steel sheet according to [3], in which the hot-dip galvanized layer may be a hot-dip galvannealed layer.

[5] A manufacturing method of a steel sheet according to another aspect of the present invention has:
  a hot rolling step of performing a rough rolling at a rolling reduction of 10% or larger using a roll having a diameter of 100 mm or larger and a temperature of 300° C. or lower after heating a slab having the chemical composition according to [1] or [2] to 1050° C. or higher and then performing finish rolling,
  a coiling step of cooling and coiling the slab after the hot rolling step to produce a steel strip,
  a heating step of heating the steel strip after the coiling step up to a temperature range of Ac3 or higher and lower than 900° C. in an atmosphere with a $N_2$ concentration of 80% or higher and retaining the steel strip in the temperature range for five seconds or longer, and
  a cooling step of cooling the steel strip after the heating step to a temperature of lower than 550° C. at a rate of an average cooling rate of 20° C./s or faster.

[6] The manufacturing method of a steel sheet according to [5], in which a hot-dip galvanized layer may be formed on a surface of the steel strip by preforming hot-dip galvanizing on the steel strip after the cooling step.

[7] The manufacturing method of a steel sheet according to [6], in which a heat alloying treatment may be performed after the hot-dip galvanizing is performed.

Effects of the Invention

According to the present invention, it is possible to provide a steel sheet having a high strength, excellent LME resistance and excellent bendability and a manufacturing method thereof.

BRIEF DESCRIPTION OF DRAWINGS

FIG. 1 is a schematic view showing an appearance of a test in which two steel sheets are spot-welded and liquid metal embrittlement cracking resistance (LME resistance) is evaluated.

EMBODIMENT(S) FOR IMPLEMENTING THE INVENTION

Hereinafter, an embodiment of the present invention will be described. The embodiment to be exemplified below is intended to facilitate the understanding of the present invention and is not intended to interpret the present invention in a limited manner. The present invention can be modified and improved from the following embodiment within the scope of the gist of the present invention.

Steel Sheet
  A steel sheet according to the present embodiment,
  in which a chemical composition contains, by mass %,
  C: 0.15% or more and 0.45% or less,
  Si: 0.01% or more and 2.50% or less,
  Mn+Cr: 1.20% or more and 4.00% or less,
  Al: 0.10% or more and 2.00% or less,
  N: 0.0010% or more and 0.010% or less,
  P: 0.040% or less,
  S: 0.010% or less,
  O: 0.006% or less,
  Mo: 0% or more and 0.50% or less,
  Ti: 0% or more and 0.20% or less,
  Nb: 0% or more and 0.20% or less,
  B: 0% or more and 0.010% or less,
  V: 0% or more and 0.50% or less,
  Cu: 0% or more and 1.00% or less,
  W: 0% or more and 0.10% or less,
  Ta: 0% or more and 0.10% or less,
  Ni: 0% or more and 1.00% or less,
  Sn: 0% or more and 0.050% or less,
  Co: 0% or more and 0.50% or less,
  Sb: 0% or more and 0.050% or less,
  As: 0% or more and 0.050% or less,
  Mg: 0% or more and 0.050% or less,
  Ca: 0% or more and 0.040% or less,
  Y: 0% or more and 0.050% or less,
  Zr: 0% or more and 0.050% or less,
  La: 0% or more and 0.050% or less,
  Ce: 0% or more and 0.050% or less, and
  a remainder including Fe and an impurity,
  the tensile strength is 1300 MPa or more,
  the ratio (R/t) of a limit bend radius to a sheet thickness is less than 3.5,
  when a depth position of 30 μm from a surface in a sheet thickness direction is defined as a position A and a depth position of ¼ of the sheet thickness from the surface in the sheet thickness direction is defined as a position B,
  the number density of AlN at the position A is 3000 pieces/mm$^2$ or more and 6000 pieces/mm$^2$ or less,
  the metallographic structure at the position B includes 90% or more of martensite by volume percentage and a remainder in microstructure, and
  the hardness at the position A is 1.20 times or higher than the hardness at the position B.

Hereinafter, the steel sheet according to the present embodiment will be described.

<Chemical Composition>

Subsequently, the chemical composition of the steel sheet, which is desirable to obtain the effect of the present invention, will be described. The chemical composition of the steel sheet refers to the chemical compositions in the steel sheet central part and in the surface layer area, and the chemical composition in the surface layer area refers to the chemical composition in the matrix of the surface layer area excluding Al oxide particles. The chemical composition of the steel sheet central part and the chemical composition of the surface layer area may be the same as each other or may be different from each other within the range of the chemical composition of the steel sheet to be described below. "%" relating to the amount of an element indicates "mass %" unless particularly otherwise stated.

"C: 0.15% or more and 0.45% or less"

C is an element increasing the strength of the steel sheet and is added to increase the strength of the steel sheet. When the C content is 0.15% or more, the strength of the steel sheet can be sufficiently increased. In addition, when the C content is 0.45% or less, rupture in the elastic region of the steel sheet can be suppressed. In the case of effectively suppressing rupture in the elastic region of the steel sheet, the C content is preferably 0.40% or less and more preferably 0.35% or less.

"Si: 0.01% or more and 2.50% or less"

Si is added to contribute to high-strengthening of the steel sheet as a solid solution strengthening element. From this viewpoint, the lower limit value of the Si content is 0.01% or more and preferably 0.02% or more. When the Si content becomes large, the steel sheet central part becomes brittle, and the formability of the steel sheet deteriorates. Therefore, the Si content is 2.50% or less and preferably 2.20% or less.

"Mn+Cr: 1.20% or more and 4.00% or less"

Mn and Cr are elements added to enhance the hardenability of the steel sheet to increase the strength. In order to obtain such an effect, the total amount of Mn and Cr is set to 1.20% or more. The total amount of Mn and Cr is preferably 1.50% or more and preferably 2.00% or more. When the total amount of Mn and Cr is too large, the hardness distribution in the surface layer area of the steel sheet becomes large due to the segregation of Mn and Cr. Therefore, the total amount of Mn and Cr is set to 4.00% or less, preferably 3.50% or less and more preferably 3.00% or less.

"Al: 0.10% or more and 2.00% or less"

In the steel sheet according to the present embodiment, in order to increase the concentration of a solid solution of N in prior austenite grain boundaries, AlN is segregated in the prior austenite grain boundaries. Therefore, the Al content of the steel sheet is important.

In order to preferably segregate AlN in the prior austenite grain boundaries, the Al content is set to 0.10% or more. In a case where the Al content is less than 0.10%, the amount of AlN segregated in the prior austenite grain boundaries is insufficient, which makes the concentration of the solid solution of N in the prior austenite grain boundaries insufficient. Therefore, it is not possible to preferably prevent the inflow of molten zinc during spot welding (preferable LME resistance cannot be obtained). The Al content is preferably 0.20% or more and more preferably 0.30% or more.

On the other hand, in a case where the Al content is more than 2.00%, a risk of the occurrence of slab cracking during continuous casting is increased, which is not preferable. Therefore, the Al content is set to 2.00% or less, preferably set to 1.7% or less and more preferably set to 1.4% or less.

"P: 0.040% or Less"

P tends to be segregated in the center portion of the steel sheet and has a risk of embrittling welded parts. When the P content is set to 0.040% or less, it is possible to suppress the embrittlement of welded parts. Since P is preferably not contained, the lower limit of the P content is 0%. However, it is economically disadvantageous to set the P content to less than 0.001%, and thus the lower limit of the P content may be set to 0.001%.

"S: 0.010% or less"

S is an element having a risk of adversely affecting the weldability of the steel sheet and the manufacturability during casting and during hot rolling. Therefore, the S content is set to 0.010% or less. Since S is preferably not contained, the lower limit of the S content is 0%. However, it is economically disadvantageous to set the S content to less than 0.001%, and thus the lower limit of the S content may be set to 0.001%.

"N: 0.0010% or more and 0.010% or less"

N is an element capable of suppressing the inflow of molten zinc during spot welding when made to be present in prior austenite grain boundaries in a solid solution state. Therefore, the N content in the present embodiment is 0.0010% or more, preferably set to 0.0030% or more and more preferably set to 0.0040% or more. On the other hand, in a case where excess N is contained, there is a risk that slabs may crack during continuous casting. Therefore, the N content in the present embodiment is 0.010% or less, preferably set to 0.010% or less and more preferably set to 0.0070% or less.

"O: 0.006% or less"

O is an element that forms a coarse oxide, impairs the bendability or the hole expansibility, and causes the generation of a blowhole during welding. When O exceeds 0.006%, the deterioration of the hole expansibility or the generation of a blowhole becomes significant. Therefore, O is set to 0.006% or less. Since O is preferably not contained, the lower limit of the O content is 0%.

The remainder of the chemical composition of the steel sheet is Fe and an impurity. The impurity in the present embodiment is a component having no adverse influence on the action and effect. Instead of some of Fe, the following elements may be contained. The following elements are not essential elements for obtaining the effect in the present embodiment, and thus the lower limits of the contents are 0%. "Mo: 0% or more and 0.50% or less, B: 0% or more and 0.010% or less"

Mo and B are elements that enhance the hardenability to contribute to improvement in the strength of the steel sheet. The effects of these elements can be obtained even when the elements are added in a small amount. However, in order to sufficiently obtain the effects, it is preferable to set the Mo content to 0.01% or more and to set the B content to 0.0001% or more. On the other hand, from the viewpoint of suppressing the deterioration of the pickling property, weldability, hot workability and the like of the steel sheet, the upper limit of the Mo content is preferably set to 0.50% or less, and the upper limit of the B content is preferably set to 0.010% or less.

"Ti: 0% or more and 0.20% or less, Nb: 0% or more and 0.20% or less, V: 0% or more and 0.50% or less"

Ti, Nb and V are each an element contributing to improvement in the strength of the steel sheet. These elements contribute to an increase in the strength of the steel sheet by means of precipitation strengthening, grain refinement strengthening by the suppression of the growth of ferrite crystal grains and dislocation strengthening through the suppression of recrystallization. The effects of these elements can be obtained even when the elements are added in a small amount. However, in order to sufficiently obtain the effects, it is preferable to add 0.001% or more of Ti, 0.0001% or more of Nb and 0.001% or more of V. However, from the viewpoint of suppressing the deterioration of the formability of the steel sheet caused by an increase in the number of carbonitride precipitated, the Ti content and the Nb content are preferably set to 0.20% or less, and the V content is preferably set to 0.50% or less.

"Cu: 0% or more and 1.00% or less, Ni: 0% or more and 1.00% or less"

Cu and Ni are each an element contributing to improvement in the strength of the steel sheet. The effects of these elements can be obtained even when the elements are added in a small amount. However, in order to sufficiently obtain the effects, it is preferable to set the Cu content to 0.001% or more and to set the Ni content to 0.001% or more. On the other hand, from the viewpoint of suppressing the deterioration of the pickling property, weldability, hot workability and the like of the steel sheet, the Cu content and the Ni content are each preferably 1.00% or less.

Furthermore, instead of some of Fe, the following elements may be added intentionally or inevitably to the steel sheet central part and the surface layer area as long as the effect of the present invention can be obtained. That is, W: 0% or more and 0.10% or less or 0.001% or more and 0.10% or less, Ta: 0% or more and 0.10% or less or 0.001% or more and 0.10% or less, Sn: 0% or more and 0.050% or less or 0.001% or more and 0.050% or less, Sb: 0% or more and 0.050% or less or 0.001% or more and 0.050% or less, As: 0% or more and 0.050% or less or 0.001% or more and 0.050% or less, Mg: 0% or more and 0.050% or less or 0.0001% or more and 0.050% or less, Ca: 0% or more and 0.040% or less or 0.001% or more and 0.040% or less, Zr: 0% or more and 0.050% or less or 0.001% or more and 0.050% or less, Co: 0% or more and 0.50% or less or 0.001% or more and 0.050% or less, and rare-earth metals (REM) such as Y: 0% or more and 0.050% or less or 0.001% or more and 0.050% or less, La: 0% or more and 0.050% or less or 0.001% or more and 0.050% or less, and Ce: 0% or more and 0.050% or less or 0.001% or more and 0.050% or less may be added to either or both of the steel sheet central part and the surface layer area.

<Metallographic Structure>

Next, the metallographic structure of the steel sheet according to the present embodiment will be described. The proportions of structures in the metallographic structure are expressed as volume percentages. In the case of measuring area ratios by image processing, the area ratios are regarded as volume percentages. In the following description of the order of measuring volume percentages, "volume percentage" and "area ratio" are used in an interchangeable manner in some cases.

In the steel sheet according to the present embodiment, the metallographic structure at a sheet thickness ¼ position from the surface of the steel sheet (position B) includes 90% or more of martensite by volume percentage.

(Martensite)

Martensite is a full hard structure having a high dislocation density and thus contributes to improvement in the tensile strength. From the viewpoint of obtaining a tensile strength of 1300 MPa or more, the volume percentage of martensite at the sheet thickness ¼ position is set to 90% or more and preferably 95% or more. In addition, the upper limit of the volume percentage of martensite is not particularly limited and may be determined to be 100%.

(Remainder in Microstructure)

The remainder in microstructure other than martensite is not particularly limited, and examples thereof include ferrite, residual austenite, pearlite, bainite and the like.

Next, a method for measuring the volume percentage of martensite will be described.

The volume percentage of martensite is obtained in the following order. An observed section of a sample is etched with a Lepera solution, and a 100 μm×100 μm region in a sheet thickness ⅛ to ⅜ range in which a sheet thickness ¼ is centered is observed at a magnification of 3000 times using an FE-SEM. Since martensite and residual austenite are not corroded by Lepera corrosion, the area ratio of uncorroded regions is the total area ratio of martensite and residual austenite. The volume percentage of martensite is calculated by subtracting the volume percentage of residual austenite measured with X-rays from the area ratio of the uncorroded regions.

The volume percentage of residual austenite can be calculated by measurement using an X-ray diffraction device. In the measurement using an X-ray diffraction device, first, a region from the sheet surface (rolled surface) of the sample to a surface at a depth of ¼ of the sheet thickness is removed by mechanical polishing and chemical polishing. Next, on the surface at a depth of ¼ of the sheet thickness t, the integrated intensity ratios of the diffraction peaks of (200) and (211) of a bcc phase and (200), (220) and (311) of an fcc phase are obtained using MoKα rays as characteristic X rays, and the volume percentage of residual austenite can be calculated based on these integrated intensities.

In addition, martensite can be distinguished from other structures in an electron channeling contrast image captured with a scanning electron microscope. In the above-described image, a region having a high dislocation density and having a substructure such as a block or a packet in crystal grains is martensite.

<Number Density of AlN at Depth Position of 30 μm from Surface of Steel Sheet in Sheet Thickness Direction (Position A): 3000 Pieces/Mm$^2$ or More and 6000 Pieces/Mm$^2$ or Less>

In the present embodiment, a solid solution of N is segregated in prior austenite grain boundaries in the surface layer of the steel sheet, whereby the intrusion of molten zinc into the prior austenite grain boundaries during spot welding is suppressed, and the occurrence of LME is suppressed. Since N has a high affinity to Al, when a certain amount of AlN is precipitated in the prior austenite grain boundaries, it is possible to effectively segregate the solid solution of N in the prior austenite grain boundaries.

In the steel sheet according to the present embodiment, the number density of AlN at the position A is 3000 pieces/mm$^2$ or more and 6000 pieces/mm$^2$ or less. When the number density of AlN in the surface layer of the steel sheet, which is represented by the position A, is set to 3000 pieces/mm$^2$ or more, it is possible to sufficiently segregate the solid solution of N in the prior austenite grain boundaries. The solid solution of N segregated in the prior austenite grain boundaries suppresses the intrusion of molten zinc into the prior austenite grain boundaries during spot welding. The number density of AlN at the position A is preferably 3500 pieces/mm$^2$ or more. When a number of AlN are present inside the steel sheet, the toughness deteriorates. Therefore, in the center of the steel sheet in the sheet thickness direction, the number density of AlN is preferably 2000 pieces/mm$^2$ or less. In the steel sheet according to the present embodiment, since the Al concentration is high, a weakly deoxidized product such as a SiMn composite oxide is not formed. In addition, since the concentration of dissolved oxygen is low and thus secondary deoxidation product also decreases, the number of oxide particles becomes smaller than usual. Incidentally, when the number density of AlN at the position A is set to 6000 pieces/mm$^2$ or less, it is possible to suppress a phenomenon in which AlN acts as an origin of break, the steel sheet ruptures due to a low distortion, and a desired strength cannot be obtained. The number density of AlN at the position A is preferably 5000 pieces/mm$^2$ or less.

Next, a method for measuring the number density of AlN at the position A will be described.

First, the steel sheet is cut perpendicularly to the surface of the steel sheet such that the cut surface is along a rolling direction. Next, a sample enabling the observation of a 10 μm×10 μm region is collected from the depth position A of 30 μm from the surface of the steel sheet by FIB processing, and thin film samples having a thickness of 100 nm or more and 300 nm or less are produced. After that, for the sample from the depth position A, the element maps of Al and N in the thin film samples are produced from 20 visual fields in the 10 μm×10 μm range at a magnification of 9000 times using a field-emission transmission electron microscope and an embedded energy-dispersive X-ray spectrometer (EDS).

Since the numbers of Al atoms and N atoms detected become significantly large in a place where AlN has been precipitated compared with a place where AlN is not precipitated, a region where the numbers of Al atoms and N atoms detected are large is determined to be AlN, the number of AlN is counted, and this number is divided by the observation area, whereby the number density of AlN at the position A can be obtained.

Here, the surface of the steel sheet at the position A refers to a depth position from the interface between a plate and the steel sheet in the case of a plated steel sheet, a position from the surface of the steel sheet in the case of a cold-rolled steel sheet, and a depth position from the interface between the steel sheet and a scale in the case of a hot-rolled steel sheet.

In addition, the sampling position in the position A is the central position of the steel sheet in the width direction.

<Tensile Strength: 1300 MPa or More>

In the steel sheet according to the present embodiment, as a strength contributing to the weight reduction of vehicle bodies of vehicles, the tensile strength (TS) is set to 1300 MPa or more.

The tensile strength is measured by collecting a JIS No. 5 tensile test piece described in JIS Z 2201: 1998 from the steel sheet in a direction perpendicular to the rolling direction and performing a tensile test in accordance with JIS Z 2241: 2011.

<Hardness at Position a being 1.20 Times or Higher than Hardness at Position B>

In the steel sheet according to the present embodiment, the hardness at the position A is 1.20 times or higher than the hardness at the position B. That is, the steel sheet according to the present embodiment has a configuration in which the surface layer area is harder than the inside. This is because the steel sheet is annealed in a $N_2$ atmosphere as described below and thus a number of the solid solution of N are present in the surface layer area.

Next, a method for measuring the hardness at the position A and at the position B will be described.

The hardness is measured based on JIS Z 2244: 2009 Vickers hardness test. The load is set such that an indentation measures several micrometers, and the hardness is measured in 400 μm×400 μm regions at 0.2 μm pitches. In addition, the average of the hardness values at the position A and the average of the hardness values at the position B are calculated.

The position B is in a sheet thickness ⅛ to ⅜ range in which the sheet thickness ¼ position from the surface layer of the steel sheet is centered and at the center in the width direction.

<Ratio (R/t) of Limit Bend Radius to Sheet Thickness: Less than 3.5>

In the steel sheet according to the present embodiment, as bendability contributing to the formability of vehicle components, the ratio (R/t) of the limit bend radius to the sheet thickness is set to less than 3.5. The limit bend radius R is measured by performing a bend test according to JIS Z 2248: 2006.

<Sheet Thickness>

The sheet thickness of the steel sheet according to the present embodiment is not particularly limited and can be set to 0.5 mm to 4.0 mm.

The steel sheet of the present embodiment may have a hot-dip galvanized layer, a hot-dip galvannealed layer or an electrogalvanized layer on the surface of the steel sheet. Even in a case where a plating layer is formed as described above, the steel sheet of the present embodiment exhibits desired characteristics.

[Manufacturing Method of Steel Sheet]

Next, an example of a manufacturing method for obtaining the steel sheet of the present embodiment will be described.

A manufacturing method of the steel sheet according to the present embodiment has a hot rolling step of performing a rough rolling at a rolling reduction of 10% or larger using a roll having a diameter of 100 mm or larger and a temperature of 300° C. or lower after heating a slab having the above-described chemical composition to 1050° C. or higher and then performing a finish rolling, a coiling step of cooling and coiling the slab after the hot rolling step to produce a steel strip, a heating step of heating the steel strip after the coiling step up to a temperature range of Ac3 or higher and lower than 900° C. in an atmosphere with a $N_2$ concentration of 80% or higher and retaining the steel strip in the temperature range for five seconds or longer, and a cooling step of cooling the steel strip after the heating step to a temperature of lower than 550° C. at a rate of an average cooling rate of 20° C./s or faster.

(Hot Rolling Step)

In the hot rolling step, a slab having the above-described chemical composition in a state of having been heated to 1050° C. or higher is rough-rolled at a rolling reduction of 10% or larger using a roll having a diameter (hereinafter, simply referred to as "diameter" in some cases) of 100 mm or larger and a temperature of 300° C. or lower and then finish-rolled.

Slab Heating Temperature: 1050° C. or Higher

In the manufacturing method of the steel sheet according to the present embodiment, the slab heating temperature in the hot rolling step is set to 1050° C. or higher. When the slab heating temperature in the hot rolling step is set to 1050° C. or higher, it is possible to sufficiently dissolve AlN present in the slab and to make AlN sufficiently present in the prior austenite grain boundaries in a final product. The slab heating temperature is preferably 1100° C. or higher. The upper limit value of the heating temperature is not particularly regulated, but is normally 1300° C. or lower.

Roll diameter in rough rolling: 100 mm or larger, roll temperature: 300° C. or lower, rolling reduction: 10% or larger In the manufacturing method of the steel sheet according to the present embodiment, in each pass, the roll diameter in the rough rolling is set to 100 mm or larger, the roll temperature is set to 300° C. or lower, and the rolling reduction is set to 10% or larger.

When the roll diameter is set to 100 mm or larger, it is possible to preferably cool the steel sheet through heat removal by the roll during the rough rolling and to sufficiently precipitate AlN. The upper limit of the roll diameter is not particularly determined and may be determined to be 500 mm or smaller from the viewpoint of the facility costs.

When the roll temperature is set to 300° C. or lower, it is possible to preferably cool the steel sheet through heat removal by the roll during the rough rolling and to sufficiently precipitate AlN. The roll temperature refers to the surface temperature of the roll and is a calculated value of the average of the surface temperature of the roll while the roll and the steel sheet are in contact with each other, from the roll temperature in the width central portion measured using a radiation-type thermometer at measurement positions. Here, the measurement positions is positions where the rotation angle of the roll becomes 90 degrees from the contact surface between the roll and the steel sheet on the exit side of the roll when the roll is rotated around the shaft of the roll. Regarding the calculation method, Non-Patent Document 1 was referenced. The surface temperatures of ordinary rolls become 400° C. or higher. Therefore, the roll temperature is controlled to be 300° C. or lower by adjusting, for example, the amount of water being sprayed to the roll from the entrance side of the roll while measuring the roll temperature. The lower limit of the roll temperature is not particularly determined and may be determined to be 100° C. or higher from the viewpoint of the manufacturability.

When the rolling reduction in the rough rolling is set to 10% or larger, it is possible to sufficiently add distortions and to increase the precipitation sites of AlN. The rolling reduction is preferably set to 15% or larger. The upper limit of the rolling reduction is not particularly determined and may be determined to be 50% or larger from the viewpoint of the manufacturability.

In the manufacturing method of the steel sheet according to the present embodiment, the conditions for the finish rolling are not particularly determined, and the finish rolling may be performed according to a normal method.

(Coiling Step)

In the manufacturing method of the steel sheet according to the present embodiment, a coiling step of cooling and coiling the slab after the hot rolling step to produce a steel strip is provided. The conditions for the coiling step are not particularly determined, and the coiling step may be performed according to a normal method.

(Cold Rolling Step)

After the coiling, cold rolling may be further performed as necessary. The cumulative rolling reduction in the cold rolling is not particularly limited, but is preferably set to 30% to 70% from the viewpoint of the shape stability of the steel sheet.

(Heating Step)

Next, in the heating step, the steel strip after the coiling step is heated up to the austenite single-phase region. In the heating step, AlN precipitated in the hot rolling step functions as pinning particles with respect to the grain growth of austenite and is present in austenite grain boundaries. Therefore, AlN present in the austenite grain boundaries is disposed in the prior austenite grain boundaries in the cooled steel sheet. Furthermore, the steel strip is heated in a $N_2$ atmosphere, whereby the solid solution of N intrudes into the surface layer of the steel sheet. Since the solid solution of N has a high affinity to Al present in AlN, the solid solution of N is segregated in the prior austenite grain boundaries.

In the manufacturing method of the steel sheet according to the present embodiment, the steel strip after the coiling step is heated up to a temperature range of Ac3 or higher and lower than 900° C. in an atmosphere with a $N_2$ concentration of 80% or higher and retained in the temperature range for five seconds or longer (heating step).

When the $N_2$ concentration in the atmosphere of the heating step is set to 80% or higher, the number density of AlN in the surface layer and the concentration of the solid solution of N present in the prior austenite grain boundaries become sufficient values. The $N_2$ concentration in the heating step is preferably 85% or higher. The upper limit of the $N_2$ concentration in the atmosphere of the heating step is not particularly determined and may be determined to be 95% or lower from the viewpoint of the facility costs.

In the heating step, the dew point is set to −30° C. or lower, whereby it is possible to suppress the growth of an internal oxide in the surface layer of the steel sheet. When the dew point is higher than −30° C., in high Al steel sheets having a high Ac3 point (containing 0.10% or more of Al), an oxide is likely to become coarse during the heating step, and the bendability deteriorates. The dew point in the heating step is preferably −40° C. or lower. The lower limit of the dew point in the heating step is not particularly determined and may be set to −50° C. or higher from the viewpoint of the manufacturing costs.

When the heating temperature in the heating step is set to Ac3 or higher, a desired metallographic structure (martensite is 90% or more) can be obtained.

In a case where the heating temperature in the heating step is 900° C. or higher, the manufacturing costs increase, which is not preferable. Therefore, the heating temperature in the heating step is set to lower than 900° C.

The retention time in a temperature range of Ac3 or higher and lower than 900° C. is set to five seconds or longer, whereby the desired metallographic structure can be obtained. The retention time in the temperature range is preferably 10 seconds or longer.

The upper limit of the retention time in the temperature range is not particularly determined and may be determined to be 500 seconds or shorter from the viewpoint of the productivity. While the steel strip is retained at the temperature, the temperature of the steel strip does not need to be constant.

(Cooling Step)

Next, the steel strip after the heating step is cooled to a temperature of lower than 550° C. at a rate of an average cooling rate of 20° C./s or faster (cooling step). In the cooling step, a metallographic structure where martensite is 90% or more is formed.

The average cooling rate during the cooling to a temperature of lower than 550° C. is set to 20° C./s or faster, whereby a sufficient amount of a martensite structure can be obtained.

In the present embodiment, the $N_2$ atmosphere during annealing is controlled to introduce the solid solution of N into the surface layer of the steel sheet, and the subsequent cooling conditions are controlled to generate a full hard structure. This is different from a nitriding treatment where N is introduced into the surface layer after the control of the metallographic structure. In a case where a full hard structure is formed and then a nitriding treatment is performed, since martensite is excessively tempered, it is not possible to ensure a sufficient tensile strength.

Hot-dip galvanizing may be performed on the surface of the steel sheet after the cooling step. This makes it possible to obtain a hot-dip galvanized steel sheet having a hot-dip galvanized layer formed on the surface of the steel sheet. In a case where hot-dip galvanizing is performed, the temperature of a hot-dip galvanizing bath into which the steel sheet is immersed may be a condition that has been conventionally applied. That is, the temperature of the hot-dip galvanizing bath is set to, for example, 440° C. or higher and 550° C. or lower.

In addition, a heat alloying treatment may be performed after the hot-dip galvanizing is performed as described above. This makes it possible to obtain a galvannealed steel sheet having a hot-dip galvannealed layer formed on the surface of the steel sheet. The heating temperature during the alloying in the case of performing the heat alloying treatment may be a condition that has been conventionally applied. That is, the heating temperature during the alloying is set to, for example, 400° C. or higher and 600° C. or lower. A heating method during the alloying is not particularly limited, and heating methods adapted to conventional hot-dip plating facilities such as direct heating with combustion gas, induction heating and direct energization heating can be used. After the alloying treatment, the steel sheet is cooled to 200° C. or lower and temper-rolled as necessary.

In addition, as a method for manufacturing an electrolytic zinc-plated steel sheet, the following example is exemplified. For example, as a pretreatment of plating, alkaline degreasing, water washing, pickling and water washing are performed on the above-described steel sheet. After that, an electrolytic treatment is performed on the steel sheet after the pretreatment until a predetermined plate thickness is reached at a current density of approximately 100 A/dm$^2$ using, for example, a liquid circulation-type electro plating device and a plating bath composed of zinc sulfate, sodium sulfate and sulfuric acid.

EXAMPLES

The present invention will be described more specifically with reference to examples.

<Manufacturing Method>

Slabs having a chemical composition shown in Tables 1-1 and 1-2 were cast. The remainders of the chemical compositions shown in Tables 1-1 and 1-2 are iron and an impurity. A hot rolling step was performed on the cast slabs under conditions shown in Table 2-1. In addition, after the hot rolling step, a cold rolling step was performed on some of the hot-rolled steel sheets in cold rolling reductions shown in Table 2-1. "–" in the column "cold rolling step" in Table 2-1 indicates that the cold rolling step was not performed. Values shown in the tables indicate the minimum values of the roll diameters, the maximum values of the roll temperatures and the minimum values of the rolling reductions. Next, the slabs after the hot rolling step were cooled and wound to produce steel strips (coiling step). A heating step and a cooling step were performed on the steel strips after the coiling step under conditions shown in Table 2-2.

In some of the examples, hot-dip galvanizing and an alloying treatment were performed after the cooling step.

TABLE 1-1

| No. | C | Si | Mn + Cr | Al | N | P | S | O | Mo | Ti | Nb | B | v | Cu | Note |
|---|---|---|---|---|---|---|---|---|---|---|---|---|---|---|---|
| A | 0.43 | 0.06 | 3.93 | 1.79 | 0.002 | 0.003 | 0.001 | 0.003 | | | | | | | Example |
| B | 0.24 | 0.70 | 2.54 | 0.66 | 0.001 | 0.004 | 0.000 | 0.000 | | | | | | | Example |
| C | 0.37 | 0.22 | 3.88 | 1.58 | 0.002 | 0.006 | 0.005 | 0.001 | | | | | | | Example |
| D | 0.29 | 0.47 | 2.76 | 0.42 | 0.002 | 0.003 | 0.008 | 0.002 | | 0.17 | | | | | Example |
| E | 0.23 | 1.99 | 3.35 | 0.61 | 0.002 | 0.003 | 0.001 | 0.001 | | | | | | | Example |
| F | 0.20 | 0.51 | 2.90 | 1.06 | 0.006 | 0.002 | 0.002 | 0.000 | 0.04 | | | | | | Example |
| G | 0.39 | 0.03 | 3.58 | 1.11 | 0.001 | 0.003 | 0.001 | 0.000 | 0.11 | | | | | | Example |
| H | 0.26 | 1.98 | 2.81 | 0.29 | 0.003 | 0.002 | 0.001 | 0.001 | | 0.01 | 0.11 | | | | Example |
| I | 0.15 | 1.20 | 2.73 | 0.30 | 0.002 | 0.020 | 0.001 | 0.005 | | | | | | | Example |
| J | 0.42 | 0.15 | 3.89 | 1.70 | 0.003 | 0.008 | 0.003 | 0.000 | | 0.03 | | | | | Example |
| K | 0.22 | 1.02 | 2.47 | 0.38 | 0.008 | 0.030 | 0.008 | 0.000 | | 0.02 | | 0.002 | | | Example |
| L | 0.18 | 0.67 | 2.40 | 0.17 | 0.002 | 0.003 | 0.001 | 0.001 | | 0.03 | | 0.001 | | | Example |
| M | 0.27 | 0.16 | 2.19 | 0.84 | 0.001 | 0.003 | 0.001 | 0.001 | 0.16 | | | | 0.03 | 0.06 | Example |
| N | 0.40 | 0.04 | 3.69 | 1.38 | 0.008 | 0.011 | 0.000 | 0.004 | 0.04 | | | | 0.03 | 0.77 | Example |
| O | 0.33 | 0.02 | 3.69 | 1.32 | 0.002 | 0.033 | 0.001 | 0.000 | | 0.01 | 0.02 | | | | Example |
| P | 0.11 | 0.65 | 3.74 | 0.36 | 0.003 | 0.008 | 0.001 | 0.000 | 0.48 | | | | 0.27 | 0.82 | Comparative Example |
| Q | 0.49 | 0.70 | 2.07 | 0.46 | 0.002 | 0.005 | 0.001 | 0.001 | | 0.14 | 0.15 | 0.001 | | | Comparative Example |
| R | 0.32 | 0.90 | 1.10 | 0.33 | 0.007 | 0.006 | 0.001 | 0.001 | | 0.01 | | | 0.03 | 0.05 | Comparative Example |
| S | 0.27 | 0.09 | 2.37 | 0.03 | 0.008 | 0.023 | 0.001 | 0.005 | | | | | | | Comparative Example |
| T | 0.29 | 2.02 | 2.34 | 2.05 | 0.002 | 0.025 | 0.001 | 0.000 | | | | | | | Comparative Example |
| U | 0.23 | 1.34 | 2.30 | 0.60 | 0.0008 | 0.005 | 0.001 | 0.004 | | | | | | | Comparative Example |
| V | 0.30 | 0.70 | 1.68 | 0.54 | 0.015 | 0.003 | 0.009 | 0.004 | | | | | | | Comparative Example |

TABLE 1-2

| No. | W | Ta | Ni | Sn | Co | Sb | As | Mg | Ca | Y | Zr | La | Ce | Ac3 (° C.) | Note |
|---|---|---|---|---|---|---|---|---|---|---|---|---|---|---|---|
| A | | | | | | | | | | | | | | 897 | Example |
| B | | | | | | | | | | | | | | 858 | Example |
| C | | | | | | | | | | | | | | 890 | Example |
| D | | | | | | | | | | | | | | 872 | Example |
| E | | | | | | | | | | | | | | 892 | Example |
| F | | | 0.506 | | 0.377 | | | | | | 0.008 | 0.041 | 0.008 | 894 | Example |
| G | | | | | | | | | | | | | | 832 | Example |
| H | | | | | | | | | | | | | | 865 | Example |
| I | | | | | | | | | | | | | | 854 | Example |
| J | 0.011 | 0.080 | 0.640 | | 0.062 | | | 0.004 | 0.002 | | | | | 896 | Example |
| K | | | | | | | | | | | | | | 857 | Example |
| L | | | 0.065 | 0.002 | | | | | | | | | | 826 | Example |
| M | | 0.010 | | | | 0.003 | 0.002 | 0.004 | 0.003 | | | | | 865 | Example |
| N | | | | | | | | | | | | | | 851 | Example |
| O | | | | | | 0.013 | 0.007 | | | 0.006 | 0.003 | 0.028 | | 865 | Example |

TABLE 1-2-continued

| No. | W | Ta | Ni | Sn | Co | Sb | As | Mg | Ca | Y | Zr | La | Ce | Ac3 (° C.) | Note |
|---|---|---|---|---|---|---|---|---|---|---|---|---|---|---|---|
| P | | | | | | | | | | | | | | 850 | Comparative Example |
| Q | 0.010 | | | 0.008 | 0.043 | 0.040 | 0.004 | | | | | 0.003 | 0.007 | 860 | Comparative Example |
| R | 0.011 | 0.010 | 0.848 | | | | | 0.042 | 0.040 | 0.003 | 0.005 | | | 845 | Comparative Example |
| S | | | | | | | | | | | | | | 758 | Comparative Example |
| T | | | | | | | | | | | | | | 1079 | Comparative Example |
| U | | | | | | | | | | | | | | 887 | Comparative Example |
| V | | | | | | | | | | | | | | 863 | Comparative Example |

TABLE 2-1

| | | Rough rolling in hot rolling step | | | Cold rolling |
|---|---|---|---|---|---|
| Steel type | No. | Heating temperature of slab (° C.) | Roll diameter (mm) | Roll temperature (° C.) | Rolling reduction (%) | Rolling reduction (%) |
| A | 1 | 1077 | 145 | 127 | 24.4 | 44 |
| B | 2 | 1132 | 152 | 247 | 15.8 | 58 |
| C | 3 | 1287 | 134 | 139 | 14.5 | 31 |
| D | 4 | 1111 | 182 | 122 | 12.6 | 43 |
| E | 5 | 1071 | 369 | 116 | 14.7 | 44 |
| F | 6 | 1183 | 139 | 150 | 39.9 | 51 |
| G | 7 | 1090 | 404 | 112 | 31.0 | 42 |
| H | 8 | 1217 | 158 | 127 | 13.7 | 51 |
| I | 9 | 1085 | 142 | 117 | 14.4 | 44 |
| J | 10 | 1299 | 162 | 125 | 18.2 | 52 |
| K | 11 | 1111 | 202 | 202 | 15.0 | 32 |
| L | 12 | 1077 | 158 | 124 | 15.5 | — |
| M | 13 | 1102 | 242 | 239 | 35.8 | 44 |
| N | 14 | 1270 | 296 | 173 | 20.7 | 51 |
| O | 15 | 1086 | 138 | 123 | 12.6 | 50 |
| A | 16 | 1083 | 132 | 116 | 14.2 | 43 |
| B | 17 | 1100 | 165 | 256 | 17.8 | 32 |
| C | 18 | 1078 | 247 | 234 | 14.8 | — |
| D | 19 | 1218 | 143 | 130 | 17.3 | 32 |
| E | 20 | 1267 | 138 | 121 | 13.8 | 51 |
| F | 21 | 1292 | 358 | 118 | 40.2 | 58 |
| G | 22 | 1106 | 174 | 206 | 13.0 | 43 |
| H | 23 | 1175 | 141 | 117 | 14.8 | 42 |
| I | 24 | 1133 | 202 | 139 | 25.1 | 57 |
| J | 25 | 1089 | 148 | 167 | 13.7 | 42 |
| K | 26 | 1081 | 167 | 124 | 15.0 | 50 |
| L | 27 | 1277 | 145 | 123 | 29.6 | 44 |
| M | 28 | 1114 | 310 | 147 | 13.9 | 42 |
| N | 29 | 1079 | 393 | 132 | 19.4 | — |
| O | 30 | 1085 | 146 | 117 | 35.6 | 51 |
| P | 31 | 1082 | 176 | 121 | 25.3 | 51 |
| Q | 32 | 1182 | 132 | 117 | 13.6 | 32 |
| R | 33 | 1261 | 138 | 115 | 13.0 | 42 |
| S | 34 | 1113 | 308 | 233 | 21.2 | 51 |
| T | 35 | Since Al-induced embrittlement is significant and slab cracks, subsequent test is stopped | | | | |
| U | 36 | 1139 | 186 | 134 | 14.5 | 42 |
| V | 37 | Since AlN precipitation-induced embrittlement is significant and slab cracks, subsequent test is stopped | | | | |
| A | 38 | 1043 | 218 | 119 | 16.2 | 43 |
| B | 39 | 1141 | 85 | 119 | 25.5 | 31 |
| C | 40 | 1111 | 152 | 306 | 12.7 | 52 |
| D | 41 | 1085 | 151 | 122 | 8.9 | 50 |
| E | 42 | 1096 | 134 | 120 | 32.0 | 58 |
| F | 43 | 1091 | 372 | 211 | 20.1 | 30 |
| G | 44 | 1300 | 392 | 127 | 12.6 | 43 |
| H | 45 | 1239 | 130 | 149 | 37.8 | 43 |
| I | 46 | 1158 | 142 | 121 | 13.9 | 42 |

TABLE 2-2

| | | Continuous annealing | | | | |
|---|---|---|---|---|---|---|
| Steel type | No. | Heating temperature (° C.) | Dew point (° C.) | N₂ concentration in atmosphere (%) | Retention time (seconds) | Cooling rate (° C./s) |
| A | 1 | 898 | −55 | 82 | 155 | 97 |
| B | 2 | 897 | −36 | 84 | 180 | 75 |
| C | 3 | 898 | −49 | 93 | 416 | 112 |
| D | 4 | 888 | −37 | 82 | 469 | 55 |
| E | 5 | 896 | −32 | 82 | 389 | 102 |
| F | 6 | 897 | −42 | 82 | 359 | 80 |
| G | 7 | 847 | −52 | 81 | 310 | 79 |
| H | 8 | 885 | −33 | 82 | 461 | 26 |
| I | 9 | 883 | −45 | 83 | 59 | 51 |
| J | 10 | 897 | −37 | 84 | 281 | 118 |
| K | 11 | 870 | −55 | 91 | 14 | 39 |
| L | 12 | 853 | −55 | 87 | 229 | 31 |
| M | 13 | 877 | −53 | 86 | 246 | 91 |
| N | 14 | 866 | −53 | 83 | 113 | 83 |
| O | 15 | 872 | −42 | 95 | 87 | 82 |
| A | 16 | 897 | −33 | 81 | 450 | 119 |
| B | 17 | 887 | −55 | 82 | 210 | 71 |
| C | 18 | 890 | −49 | 95 | 49 | 113 |
| D | 19 | 879 | −54 | 91 | 110 | 37 |
| E | 20 | 897 | −43 | 82 | 425 | 41 |
| F | 21 | 899 | −35 | 83 | 467 | 66 |
| G | 22 | 853 | −48 | 85 | 34 | 89 |
| H | 23 | 878 | −49 | 82 | 313 | 28 |
| I | 24 | 876 | −49 | 82 | 246 | 31 |
| J | 25 | 896 | −52 | 82 | 392 | 128 |
| K | 26 | 863 | −48 | 82 | 93 | 30 |
| L | 27 | 831 | −33 | 93 | 163 | 94 |
| M | 28 | 867 | −46 | 83 | 184 | 102 |
| N | 29 | 859 | −49 | 87 | 337 | 108 |
| O | 30 | 870 | −52 | 85 | 285 | 130 |
| P | 31 | 888 | −54 | 84 | 429 | 31 |
| Q | 32 | 896 | −55 | 82 | 326 | 72 |
| R | 33 | 874 | −34 | 84 | 448 | 37 |
| S | 34 | 876 | −53 | 91 | 490 | 46 |
| T | 35 | Since Al-induced embrittlement is significant and slab cracks, subsequent test is stopped | | | | |
| U | 36 | 897 | −39 | 82 | 115 | 56 |
| V | 37 | Since AlN precipitation-induced embrittlement is significant and slab cracks, subsequent test is stopped | | | | |
| A | 38 | 897 | −44 | 83 | 76 | 102 |
| B | 39 | 889 | −34 | 83 | 234 | 56 |
| C | 40 | 898 | −50 | 93 | 433 | 141 |
| D | 41 | 892 | −51 | 83 | 124 | 37 |
| E | 42 | 867 | −47 | 82 | 67 | 60 |
| F | 43 | 896 | −50 | 76 | 153 | 96 |
| G | 44 | 869 | −47 | 82 | 2 | 84 |
| H | 45 | 867 | −55 | 84 | 380 | 9 |
| I | 46 | 881 | −21 | 86 | 62 | 49 |

<Measurement of Tensile Strength>

Tensile strengths were measured by collecting JIS No. 5 tensile test pieces described in JIS Z 2201: 1998 from the steel sheets in a direction perpendicular to a rolling direction and performing a tensile test in accordance with JIS Z 2241: 2011. The results are shown in Table 3.

<Measurement of Metallographic Structure>

The obtained steel sheets were used as samples, and observed sections of the samples were etched with a Lepera solution. 100 μm×100 μm regions in sheet thickness ⅛ to ⅜ ranges in which a sheet thickness ¼ was centered were observed at a magnification of 3000 times using an FE-SEM, and the area ratios of uncorroded regions were obtained. These area ratios were the total area ratios of martensite and residual austenite, and these area ratios were regarded as volume percentages and indicated by A.

In addition, the volume percentages of residual austenite were obtained as described below using an X-ray diffraction device. First, regions from the sheet surfaces (rolled surfaces) of the samples to surfaces at a depth of ¼ of the sheet thicknesses were removed by mechanical polishing and chemical polishing. Next, on the surfaces at a depth of ¼ of the sheet thicknesses, the integrated intensity ratios of the diffraction peaks of (200) and (211) of bcc phases and (200), (220) and (311) of fcc phases were obtained using MoKα rays as characteristic X rays. The volume percentages of residual austenite were calculated based on these integrated intensities, and these volume percentages were indicated by B.

Differences between A and B, which were volume percentages obtained by the above-described two methods, that is, (A-B), were regarded as the volume percentages of martensite.

The volume percentages of martensite obtained as described above were shown in Table 3.

<Measurement of Number Density of AlN>

Samples were collected from sheet width center portions. The steel sheets were cut perpendicularly to the surfaces of the steel sheets such that the cut surfaces were along a rolling direction, next, the samples enabling the observation of a 10 μm×10 μm region were collected from the depth positions of 30 μm from the surfaces of the steel sheets by FIB processing, and thin film samples having a thickness of 100 nm or more and 300 nm or less were produced.

After that, for the samples from the depth positions A, the element maps of Al and N in the thin film samples were produced in the 10 μm×10 μm ranges at a magnification of 9000 times using a field-emission transmission electron microscope and an embedded energy-dispersive X-ray spectrometer (EDS). Since the numbers of Al atoms and N atoms detected became significantly large in a place where AlN had been precipitated compared with a place where AlN was not precipitated, regions where the numbers of Al atoms and N atoms detected were large were determined to be AlN, the numbers of AlN were counted, and these numbers were divided by the observation areas, whereby the number densities of AlN at the positions A could be obtained.

The results are shown in Table 3.

<Measurement of Hardness at Position A and position B>

Hardness was measured based on JIS Z 2244: 2009 Vickers hardness test. The load was set such that an indentation measured several micrometers, and the hardness was measured in 400 μm×400 μm regions at 0.2 μm pitches. In addition, the average of the hardness values at the position A (surface layer hardness) and the average of the hardness values at the position B (central hardness) were calculated.

The results are shown in Table 3.

<Evaluation of LME Resistance>

50 mm×80 mm test pieces were collected from the sheet width center portions of the steel sheets of Examples Nos. 1 to 34, 36 and 38 to 46. In addition, the steel sheets of Examples Nos. 1 to 34, 36 and 38 to 46 were manufactured and then immersed in a hot-dip galvanizing bath to manufacture hot-dip galvanized steel sheets, and 50 mm×80 mm test pieces were collected. The test pieces collected from the cold-rolled steel sheets or the hot-rolled steel sheets and the hot-dip galvanized steel sheets having a coincident example number were overlaid, the following spot welding was performed, and tests were performed to evaluate liquid metal embrittlement cracking resistance (LME resistance).

FIG. 1 shows the appearance of the test. The hot-dip galvanized steel sheet was used as a steel sheet 1d in FIG. 1, and a steel sheet that was an evaluation subject was used as a steel sheet 1e, the two sheets were overlaid and spot-welded with a pair of electrodes 4a and 4b. The welding conditions are as described below.

The plated steel sheets were welded using a servomotor pressurized single-phase alternating-current spot welder (power frequency: 50 Hz) while being pressurized at a pressure of 450 kgf (4413 kgm/s$^2$) under conditions of a current value set to 6.5 kA, an inclined angle 0 (an angle formed between a line 5 and a line 6) of the electrodes set to 3°, no up slope, an energization time set to 0.4 seconds, and a retention time after the end of energization set to 0.1 seconds. After that, the region of the central part in the nugget of the steel sheet was observed using an optical microscope, and the presence or absence of LME cracking was evaluated.

<Evaluation of Bendability>

50 mm×100 mm bend test pieces were collected from the steel sheets, and bend tests were performed according to JIS Z 2248: 2006, thereby evaluating the bendability from "minimum bend R at which no cracking occurred/sheet thickness t". This time, steel sheets having R/t of less than 3.5 were evaluated as pass. The results are shown in Table 3.

TABLE 3

| | | Structure | Surface layer form | | Material | | | |
| | | Martensite fraction | Number density of AlN | Surface layer hardness/central | Tensile strength | LME | Limit bend | |
| Steel type | No. | (%) | (pieces/mm$^2$) | hardness | (MPa) | cracking | R/t | Note |
|---|---|---|---|---|---|---|---|---|
| A | 1 | 99 | 3900 | 1.58 | 2080 | No | 2.81 | Example |
| B | 2 | 100 | 3100 | 1.33 | 1520 | No | 2.47 | Example |
| C | 3 | 100 | 3500 | 1.56 | 1970 | No | 2.34 | Example |
| D | 4 | 100 | 3100 | 1.20 | 1700 | No | 2.54 | Example |
| E | 5 | 100 | 3500 | 1.68 | 1560 | No | 2.53 | Example |
| F | 6 | 92 | 3700 | 1.67 | 1350 | No | 2.43 | Example |
| G | 7 | 99 | 5600 | 1.43 | 1960 | No | 2.74 | Example |

TABLE 3-continued

| Steel type | No. | Structure Martensite fraction (%) | Surface layer form Number density of AlN (pieces/mm$^2$) | Surface layer hardness/central hardness | Material Tensile strength (MPa) | LME cracking | Limit bend R/t | Note |
|---|---|---|---|---|---|---|---|---|
| H | 8 | 97 | 3100 | 1.62 | 1850 | No | 2.35 | Example |
| I | 9 | 100 | 3100 | 1.63 | 1310 | No | 2.88 | Example |
| J | 10 | 100 | 3800 | 1.56 | 2130 | No | 2.36 | Example |
| K | 11 | 100 | 3100 | 1.60 | 1410 | No | 2.31 | Example |
| L | 12 | 94 | 3000 | 1.55 | 1310 | No | 2.55 | Example |
| M | 13 | 100 | 3500 | 1.34 | 1680 | No | 2.47 | Example |
| N | 14 | 99 | 4000 | 1.75 | 2050 | No | 2.76 | Example |
| O | 15 | 92 | 3300 | 1.27 | 1660 | No | 2.39 | Example |
| A | 16 | 91 | 3600 | 1.53 | 1860 | No | 3.06 | Example |
| B | 17 | 91 | 3100 | 1.63 | 1340 | No | 2.71 | Example |
| C | 18 | 100 | 3400 | 1.23 | 1950 | No | 2.38 | Example |
| D | 19 | 99 | 3200 | 1.63 | 1720 | No | 2.80 | Example |
| E | 20 | 100 | 3200 | 1.27 | 1540 | No | 2.45 | Example |
| F | 21 | 95 | 5600 | 1.96 | 1390 | No | 2.48 | Example |
| G | 22 | 93 | 3200 | 1.39 | 1890 | No | 2.50 | Example |
| H | 23 | 100 | 3100 | 1.62 | 1840 | No | 2.50 | Example |
| I | 24 | 100 | 3200 | 1.62 | 1320 | No | 2.96 | Example |
| J | 25 | 91 | 3300 | 1.52 | 1930 | No | 2.42 | Example |
| K | 26 | 93 | 3100 | 1.43 | 1390 | No | 2.39 | Example |
| L | 27 | 96 | 3100 | 1.54 | 1300 | No | 2.42 | Example |
| M | 28 | 100 | 3400 | 1.32 | 1630 | No | 3.07 | Example |
| N | 29 | 100 | 4500 | 1.39 | 2010 | No | 2.36 | Example |
| O | 30 | 96 | 3900 | 1.74 | 1790 | No | 2.59 | Example |
| P | 31 | 94 | 3200 | 1.63 | 1070 | No | 2.49 | Comparative Example |
| Q | 32 | 100 | 3100 | 1.36 | Rupture in elastic region | No | 3.09 | Comparative Example |
| R | 33 | 83 | 3100 | 1.53 | 1230 | No | 2.99 | Comparative Example |
| S | 34 | 98 | 1900 | 1.05 | 1620 | Yes | 2.32 | Comparative Example |
| T | 35 | Since Al-induced embrittlement is significant and slab cracks, subsequent test is stopped | | | | | | Comparative Example |
| U | 36 | 100 | 1800 | 1.04 | 1550 | Yes | 2.62 | Comparative Example |
| V | 37 | Since AlN precipitation-induced embrittlement is significant and slab cracks, subsequent test is stopped | | | | | | Comparative Example |
| A | 38 | 94 | 2900 | 1.18 | 2020 | Yes | 2.43 | Comparative Example |
| B | 39 | 95 | 2200 | 1.11 | 1480 | Yes | 2.54 | Comparative Example |
| C | 40 | 100 | 2200 | 1.15 | 1820 | Yes | 2.86 | Comparative Example |
| D | 41 | 97 | 2100 | 1.36 | 1670 | Yes | 3.09 | Comparative Example |
| E | 42 | 70 | 3400 | 1.60 | 1190 | No | 2.89 | Comparative Example |
| F | 43 | 100 | 3600 | 1.16 | 1470 | Yes | 2.61 | Comparative Example |
| G | 44 | 85 | 3900 | 1.27 | 1250 | No | 2.51 | Comparative Example |
| H | 45 | 76 | 3200 | 1.49 | 1270 | No | 2.37 | Comparative Example |
| I | 46 | 100 | 3200 | 1.57 | 1330 | No | 3.69 | Comparative Example |

As shown in Table 1-1 to Table 3, in the examples where the requirements of the present invention were satisfied, desired characteristics could be obtained. On the other hand, in comparative examples where at least one of the requirements of the present invention was not satisfied, desired characteristics could not be obtained. Specific results are as described below.

In No. 31, since the C content was small, the tensile strength was 1070 MPa and failed to reach 1300 MPa.

In No. 32, since the C content was excessive, the steel sheet ruptured in an elastic range in the tensile test.

In No. 33, since the total amount of Mn and Cr was small, the martensite fraction was low, and the tensile strength was 1230 MPa and failed to reach 1300 MPa.

In No. 34, since the Al content was small, the number density of AlN was as small as 1900 pieces/mm$^2$, and the surface layer hardness (position A)/central hardness (position B) was as small as 1.05. Therefore, LME cracking occurred.

In No. 35, since the Al content was excessive, Al-induced embrittlement was significant, the slab cracked, and the subsequent test was stopped.

In No. 36, since the N content was small, the number density of AlN was as small as 1800 pieces/mm$^2$, and the surface layer hardness (position A)/central hardness (position B) was as small as 1.04. Therefore, LME cracking occurred.

In No. 37, since the N content was excessive, AlN-induced embrittlement was significant, the slab cracked, and the subsequent test was stopped.

In No. 38, the heating temperature of the slab was not sufficient, the number density of AlN was as small as 2900 pieces/mm², and the surface layer hardness (position A)/central hardness (position B) was as small as 1.18. Therefore, LME cracking occurred.

In No. 39, the diameter of the roll used in the hot rolling step was smaller than 100 mm, the number density of AlN was as small as 2200 pieces/mm², and the surface layer hardness (position A)/central hardness (position B) was as small as 1.11. Therefore, LME cracking occurred.

In No. 40, the roll temperature in the hot rolling step was higher than 300° C., the number density of AlN was as small as 2200 pieces/mm², and the surface layer hardness (position A)/central hardness (position B) was as small as 1.15. Therefore, LME cracking occurred.

In No. 41, the rolling reduction in the hot rolling step was small, and the number density of AlN was as small as 2100 pieces/mm² Therefore, LME cracking occurred.

In No. 42, since the heating temperature in the heating step was lower than Ac3, the martensite fraction was low, and the tensile strength was 1190 MPa and failed to reach 1300 MPa.

In No. 43, since the $N_2$ concentration in the atmosphere in the heating step was low, the surface layer hardness/central hardness was as small as 1.16, and LME cracking occurred.

In No. 44, since the retention time in a temperature range of Ac3 or higher and lower than 900° C. in the heating step was short, the martensite fraction became low, and the tensile strength was 1250 MPa and failed to reach 1300 MPa.

In No. 45, since the cooling rate in the cooling step was slow, the martensite fraction became low, and the tensile strength was 1270 MPa and failed to reach 1300 MPa.

In No. 46, since the dew point was high, RA failed to be less than 3.5.

The invention claimed is:

1. A steel sheet,
wherein a chemical composition contains, by mass %,
C: 0.15% or more and 0.45% or less,
Si: 0.01% or more and 2.50% or less,
Mn+Cr: 1.20% or more and 4.00% or less,
Al: 0.10% or more and 2.00% or less,
P: 0.040% or less,
S: 0.010% or less,
N: 0.0010% or more and 0.010% or less,
O: 0.006% or less,
Mo: 0% or more and 0.50% or less,
Ti: 0% or more and 0.20% or less,
Nb: 0% or more and 0.20% or less,
B: 0% or more and 0.010% or less,
V: 0% or more and 0.50% or less,
Cu: 0% or more and 1.00% or less,
W: 0% or more and 0.10% or less,
Ta: 0% or more and 0.10% or less,
Ni: 0% or more and 1.00% or less,
Sn: 0% or more and 0.050% or less,
Co: 0% or more and 0.50% or less,
Sb: 0% or more and 0.050% or less,
As: 0% or more and 0.050% or less,
Mg: 0% or more and 0.050% or less,
Ca: 0% or more and 0.040% or less,
Y: 0% or more and 0.050% or less,
Zr: 0% or more and 0.050% or less,
La: 0% or more and 0.050% or less,
Ce: 0% or more and 0.050% or less, and
a remainder including Fe and an impurities,
a tensile strength is 1300 MPa or more,
a ratio (R/t) of a limit bend radius to a sheet thickness is less than 3.5,
when a depth position of 30 μm from a surface in a sheet thickness direction is defined as a position A and a depth position of ¼ of the sheet thickness from the surface in the sheet thickness direction is defined as a position B,
a number density of AlN at the position A is 3000 pieces/mm² or more and 6000 pieces/mm² or less,
a metallographic structure at the position B includes 90% or more of martensite by volume percentage, and
a hardness at the position A is 1.20 times or higher than a hardness at the position B.

2. The steel sheet according to claim 1,
wherein the chemical composition contains, by mass %, one or more selected from the group of:
Mo: 0.01% or more and 0.50% or less,
Ti: 0.001% or more and 0.20% or less,
Nb: 0.0001% or more and 0.20% or less,
B: 0.0001% or more and 0.010% or less,
V: 0.001% or more and 0.50% or less,
Cu: 0.001% or more and 1.00% or less,
W: 0.001% or more and 0.10% or less,
Ta: 0.001% or more and 0.10% or less,
Ni: 0.001% or more and 1.00% or less,
Sn: 0.001% or more and 0.050% or less,
Co: 0.001% or more and 0.50% or less,
Sb: 0.001% or more and 0.050% or less,
As: 0.001% or more and 0.050% or less,
Mg: 0.0001% or more and 0.050% or less,
Ca: 0.001% or more and 0.040% or less,
Y: 0.001% or more and 0.050% or less,
Zr: 0.001% or more and 0.050% or less,
La: 0.001% or more and 0.050% or less, and
Ce: 0.001% or more and 0.050% or less.

3. The steel sheet according to claim 1, further comprising:
a hot-dip galvanized layer on the surface.

4. The steel sheet according to claim 2, further comprising:
a hot-dip galvanized layer on the surface.

5. The steel sheet according to claim 3,
wherein the hot-dip galvanized layer is a hot-dip galvannealed layer.

6. The steel sheet according to claim 4,
wherein the hot-dip galvanized layer is a hot-dip galvannealed layer.

7. A manufacturing method of the steel sheet according to claim 1, the method comprising:
a hot rolling step of performing a rough rolling at a rolling reduction of 10% or larger using a roll having a diameter of 100 mm or more and a temperature of 300° C. or lower after heating a slab having the chemical composition to 1050° C. or higher and then performing a finish rolling;
a coiling step of cooling and coiling the slab after the hot rolling step to produce a steel strip;
a heating step of heating the steel strip after the coiling step up to a temperature range of Ac3 or higher and lower than 900° C. in an atmosphere with a $N_2$ concentration of 80% or higher and retaining the steel strip in the temperature range for five seconds or longer; and a cooling step of cooling the steel strip after the heating step to a temperature of lower than 550° C. at a rate of an average cooling rate of 20° C./s or faster.

8. A manufacturing method of the steel sheet according to claim 2, the method comprising:
   a hot rolling step of performing a rough rolling at a rolling reduction of 10% or larger using a roll having a diameter of 100 mm or more and a temperature of 300° C. or lower after heating a slab having the chemical composition to 1050° C. or higher and then performing a finish rolling;
   a coiling step of cooling and coiling the slab after the hot rolling step to produce a steel strip;
   a heating step of heating the steel strip after the coiling step up to a temperature range of Ac3 or higher and lower than 900° C. in an atmosphere with a $N_2$ concentration of 80% or higher and retaining the steel strip in the temperature range for five seconds or longer; and
   a cooling step of cooling the steel strip after the heating step to a temperature of lower than 550° C. at a rate of an average cooling rate of 20° C./s or faster.

9. The manufacturing method of a steel sheet according to claim 7,
   wherein a hot-dip galvanized layer is formed on a surface of the steel strip by performing hot-dip galvanizing on the steel strip after the cooling step.

10. The manufacturing method of a steel sheet according to claim 8,
   wherein a hot-dip galvanized layer is formed on a surface of the steel strip by performing hot-dip galvanizing on the steel strip after the cooling step.

11. The manufacturing method of a steel sheet according to claim 9,
   wherein a heat alloying treatment is performed after the hot-dip galvanizing is performed.

12. The manufacturing method of a steel sheet according to claim 10,
   wherein a heat alloying treatment is performed after the hot-dip galvanizing is performed.

\* \* \* \* \*